US012664999B1

(12) United States Patent

Goggin et al.

(10) Patent No.: US 12,664,999 B1

(45) Date of Patent: Jun. 23, 2026

(54) LASER DIODE FOR HEAT-ASSISTED MAGNETIC RECORDING, AND RELATED APPARATUSES, DEVICES, SYSTEMS, AND METHODS

(71) Applicant: Seagate Technology LLC, Fremont, CA (US)

(72) Inventors: Aidan Dominic Goggin, Donegal (IE); Reyad Mehfuz, Londonderry (GB); Aritra Roy, West Bengal (IN)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/083,065

(22) Filed: Mar. 18, 2025

(51) Int. Cl.
*G11B 7/127* (2012.01)
*G11B 5/02* (2006.01)
*G11B 5/00* (2006.01)

(52) U.S. Cl.
CPC ................ *G11B 7/127* (2013.01); *G11B 5/02* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,949,187 A * | 9/1999 | Xu | ....................... | H10K 50/852 |
| | | | | 313/506 |
| 6,819,702 B2 * | 11/2004 | Sverdlov | ................. | H01S 5/028 |
| | | | | 372/102 |
| 8,223,597 B2 | 7/2012 | Komura et al. | | |
| 9,431,043 B2 | 8/2016 | Boone, Jr. et al. | | |
| 9,607,638 B1 | 3/2017 | Olsen et al. | | |
| 10,783,917 B1 | 9/2020 | Goggin et al. | | |
| 11,120,830 B1 | 9/2021 | Goggin et al. | | |
| 11,176,962 B1 | 11/2021 | Goggin et al. | | |
| 11,227,633 B1 * | 1/2022 | Goggin | ................. | G11B 5/4866 |
| 11,328,744 B1 | 5/2022 | El Hallak et al. | | |
| 11,567,834 B2 | 1/2023 | Bent | | |
| 11,823,708 B1 | 11/2023 | Krishnamurthy et al. | | |
| 11,848,036 B1 | 12/2023 | Mehfuz et al. | | |
| 2001/0017820 A1 * | 8/2001 | Akiyama | ............... | G11B 5/127 |
| | | | | 369/13.01 |
| 2002/0158263 A1 * | 10/2002 | Tanaka | ................... | G11B 7/123 |

* cited by examiner

*Primary Examiner* — Peter Vincent Agustin
(74) *Attorney, Agent, or Firm* — Mueting Raasch Group

(57) ABSTRACT

Laser diodes that include a mirror stack on the light-exit facet. The mirror stack has a reflectivity into the active region that is greater in air than when the laser diode is integrated into an apparatus. Related apparatuses, data storage devices, computing systems, and methods.

20 Claims, 6 Drawing Sheets

LASER DIODE FOR HEAT-ASSISTED MAGNETIC RECORDING, AND RELATED APPARATUSES, DEVICES, SYSTEMS, AND METHODS

BACKGROUND

The present disclosure relates to laser diodes that can be used in apparatuses such as HAMR read/write heads. There is a continuing need for laser diodes having low laser power variation.

SUMMARY

The present disclosure includes embodiments of a laser diode that includes a body and a mirror stack. The body includes one or more non-self-supporting layers of crystalline material having an active region, and has a light-exit facet at an end of the body. The mirror stack is on the light-exit facet, and includes two or more layers of dielectric material. The mirror stack has a reflectivity into the active region that is greater in laser diode-component form than when the laser diode is integrated into an apparatus. The laser diode is configured to be integrated into the apparatus to direct light from the light-exit facet of the laser diode to a waveguide in the apparatus.

BRIEF DESCRIPTION OF THE DRAWINGS

The discussion below references the following figures, wherein the same reference number may be used to identify the similar/same component in multiple figures. The schematic figures are for illustration purposes and are not necessarily drawn to scale.

DETAILED DESCRIPTION

Figure 1:
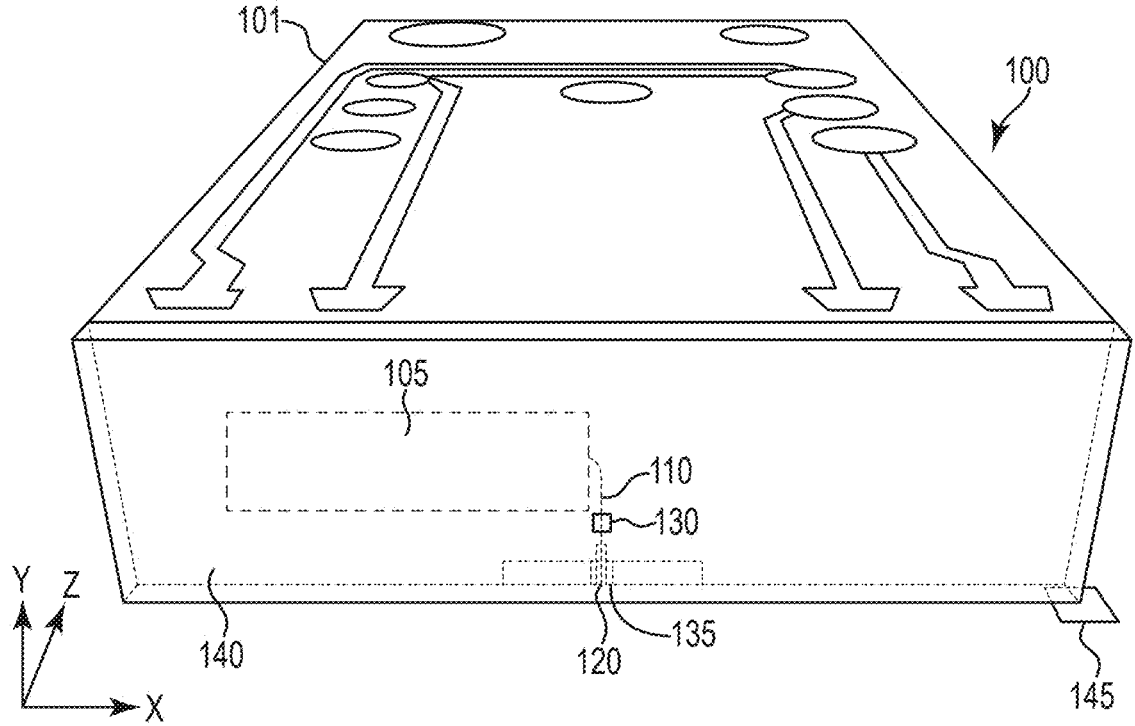
FIG. 1 is a perspective view of a read/write head having an On-Wafer Laser (OWL) in accordance with embodiments described herein.

The present disclosure relates to read/write heads used in heat-assisted magnetic recording (HAMR), also referred to as thermally-assisted recording (TAR), thermally-assisted magnetic recording (TAMR), energy-assisted magnetic recording (EAMR), etc. In this disclosure the terms "read/write head," "slider," "recording head," and "head" are used interchangeably. In a HAMR device, a read/write head includes an energy source (e.g., a laser diode) that heats a recording medium during writing. The HAMR read/write head has an optical transmission path that includes a waveguide and near-field transducer, which shape and direct the energy from the energy source to the recording medium. A non-limiting example of a HAMR read/write head is illustrated as apparatus 100 in FIG. 1, which has an On-Wafer Laser (OWL), discussed below. As used herein, the direction along x-axis is referred to as the cross-track direction; the direction along the z-axis is referred to as the opposite direction of the down-track direction (down-track direction corresponds to −z); and the direction along the y-axis is referred to as the stripe-height direction (the −y direction is referred to as the media-facing direction). In more detail, the cross-track direction is perpendicular to the tracks on a magnetic recording medium that underlies and rotates relative to a HAMR read/write head. The cross-track direction is aligned with the lateral movement of the HAMR read/write head if it switched from writing (or reading) on one track to another. The down-track direction is parallel to the tracks on the magnetic recording medium and aligned with the rotational motion of the magnetic recording medium. Referring to trailing edge surface 140 in FIG. 1, a magnetic recording medium rotates in a direction from the front of apparatus 100 (which is opposite to the trailing edge surface 140) to the trailing edge surface 140. The media-facing direction (−y) points from apparatus 100 (HAMR read/write head) toward the surface of an underlying magnetic recording medium that faces the media-facing surface 145 (also referred to as air-bearing surface (ABS).

Apparatus 100 includes a substrate and a laser diode 105 located on the substrate 101. Apparatus 100 also includes a waveguide 110 located on the substrate 101 and is optically coupled to receive light from the laser diode 105. A near-field transducer 120 (NFT) is also located on the substrate 101 and is optically coupled to receive light from the waveguide 110.

During operation, the laser diode 105 produces light that is delivered to a region proximate a HAMR read/write transducer 135, which is located near the media-facing surface 145. The media-facing surface 145 faces and is held proximate to the moving surface or recording media (not shown) while reading and writing to the recording media. The media-facing surface 145 may be configured as an air-bearing surface (ABS) that maintains separation from the media surface via a thin layer of air. The energy is used to heat the recording media as it passes by the read/write transducer 135. Optical coupling components, such as a waveguide 110, are formed integrally within the substrate 101 (also referred to as slider body), which is near a trailing edge surface 140 as shown, and functions as an optical path that delivers energy from the laser diode 105 to the recording media via the near-field transducer 120. The near-field transducer 120 is located near the read/write transducer 135 and causes heating of the recording media during recording operations. The near-field transducer 120 may be made from plasmonic materials such as gold, silver, copper, etc.

Laser power variation (LPV) can affect the drive performance of HAMR heads. LPV occurs when the lasing standing wave within a laser diode cavity is competing with external feedback from reflections external to the laser diode that can cause disturbances in the lasing mode, which can trigger the laser diode to switch abruptly between lasing modes. This switch is referred to as "mode hopping" and has a change in lasing power associated with it (LPV), which can cause a shift in the bit timing of the written track.

Laser on Slider (LOS) read/write heads and On-Wafer Laser (OWL) read/write heads are two different approaches for integrating laser diodes into the read/write heads of hard disk drives, specifically for use in Heat-Assisted Magnetic Recording (HAMR) technology. Both involve the use of laser diodes to heat the magnetic, recording media during the writing process to allow for higher data storage densities. LOS involves directly mounting the laser diode onto the slider of the read/write head, while OWL fabricates the laser diode on a separate or source substrate (wafer) and transfers it to the slider or target substrate (wafer), before further processing the target substrate into individual read/write heads.

For a laser diode to work properly specific conditions are met to achieve lasing, which is the process by which coherent light is generated through stimulated emission. For example, a laser diode relies on a threshold amount of reflected light as feedback for lasing.

Laser on Slider (LOS) read/write heads can have a reflectivity of about 5-25% at the light-exit end (front end) of the laser diode, which helps provide a relatively low LPV. LOS read/write heads rely on some reflectivity from one or more optical elements in the light path external to the laser diode to provide reflections back to the active region of the laser diode for lasing at or above the lasing threshold. However, the reflectivity at the light-exit end of a laser diode in an LOS read/write head tends to be the same in air and when the laser diode is coupled to a read/write head. Thus, it can be challenging to test the laser diode in component form in air or vacuum before coupling the laser diode to a read/write head because there are no optical elements present to provide the reflections for lasing as discussed above.

For convenience of building and testing during fabrication it can be useful for laser diodes in OWL read/write heads to have a reflectivity at the light-exit end (front end) of the laser diode that is the same in air or vacuum, and when the laser diode is coupled to a read/write head, to provide reflections for lasing at or above the lasing threshold. However, this can come at a cost of a relatively higher LPV in an OWL read/write head that contains one or more optical elements in the light path external to the laser diode to provide reflections for lasing at or above the lasing threshold.

According to the present disclosure, the light-exit end (front end) of a laser diode is configured to have a reflectivity into the active region that is greater in laser diode-component form (e.g., in air or vacuum) than when the laser diode is integrated into an apparatus. Advantageously, such a laser diode permits testing in component form in, e.g., air or vacuum by having a non-zero level of reflectivity that is at or above a lasing threshold yet has near-zero levels of reflectivity after the laser diode is coupled to (e.g., integrated into) a HIAMR read/write head. This is accomplished by having a front mirror stack with at least two layers of different dielectric materials, where the refractive index of the outermost dielectric layer (e.g., the layer adjacent to encapsulating material such as alumina) is greater than at least one inner dielectric layer. Further, the front mirror stack has a greater reflectivity in air and/or vacuum (for testing) to achieve lasing as compared to when it is coupled to a read/write head for operation where it can rely on one or more optical elements in the light path external to the laser diode to provide reflections for lasing at or above the lasing threshold. As yet another advantage, by having near-zero levels of reflectivity after the laser diode is coupled to (e.g., integrated into) a HAMR read/write head the LPV can be relatively low.

Figure 2A:
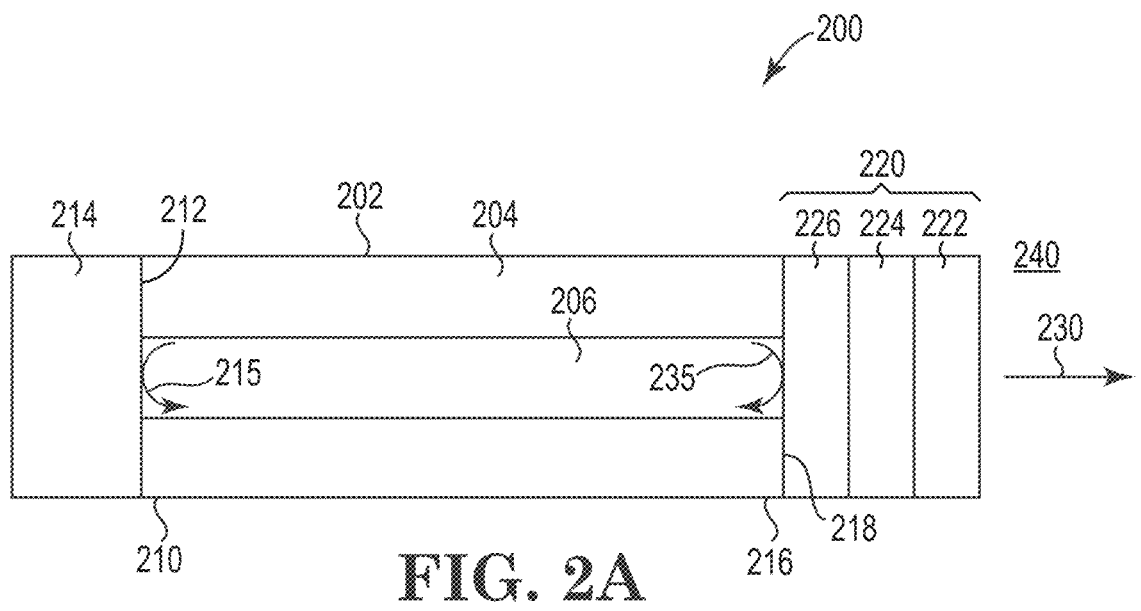
FIG. 2A is a schematic cross-section of an embodiment of a laser diode in component form having a mirror stack according to the present disclosure.
Figure 2B:
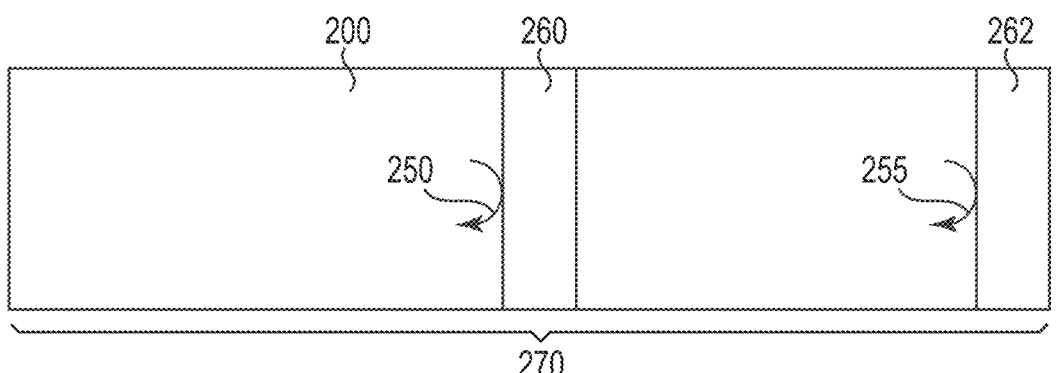
FIG. 2B is a schematic cross-section of the laser diode shown in FIG. 2A coupled to an apparatus such as a read/write head.

A non-limiting example of a laser diode for an OWL read/write head, and having a mirror stack at the front end according to the present disclosure will be illustrated with respect to FIGS. 2A and 2B. Laser diode 200 has a body 202 and a mirror stack 220 on the light-exit facet 218 (front facet).

Body 202 includes one or more non-self-supporting layers of crystalline material, (e.g., not a separately packaged device) but is physically transferred to a target read/write head substrate that does contain already or will contain, after further processing, the other components of the read/write head (e.g., write coil and poles, reader stack) without the use of a separate or intermediate support during attachment.

As shown in FIG. 2A, body 202 includes cladding 204, an active region 206, a light-exit facet 218 at the front end 216, and a back facet 212 at the back end 210.

The active region 206, or gain medium, is where light generation occurs through the process of stimulated emission. The active region of a laser diode is formed by a process known as epitaxial growth, where layers of semiconductor materials are deposited onto a substrate (e.g., substrate 300 discussed below) via molecular beam epitaxy (MBE) or metal-organic chemical vapor deposition (MOCVD). These layers form a p-n junction that constitute the active region.

The active region of a laser diode is made from semiconductor materials, often from the III-V group of the periodic table. These materials are selected for their ability to efficiently support electron-hole recombination, which generates photons (light) through the process of stimulated emission. The materials selected for the active region can depend on the desired wavelength of the laser and the specific application. Non-limiting examples of materials used to form the active region include gallium arsenide (GaAs) and alloys thereof (e.g., indium gallium arsenide (InGaAs) and aluminum gallium arsenide (AlGaAs)); indium phosphide (InP) and alloys thereof (e.g., indium gallium arsenide phosphide (InGaAsP)); gallium nitride (GaN) and alloys thereof (e.g., indium gallium nitride (InGaN) and indium gallium nitride (InGaN)); aluminum gallium indium phosphide (AlGaInP); and zinc selenide (ZnSe).

The active region is surrounded by other materials that serve important optical and electrical functions, such as guiding light and injecting charge carriers. For example, as shown in FIG. 2A active region is surround by cladding 204. Layers of cladding can be placed above and below the active region to confine the light within the active region 206. The selection of materials and formation techniques can depend on the specifications of the laser and the requirements for integration within a read/write head. Cladding layers in read/write heads can be grown around the active region using epitaxial growth methods, such as molecular beam epitaxy (MBE), or deposited through processes like sputtering or chemical vapor deposition (CVD) (e.g., metal-organic chemical vapor deposition (MOCVD)). Non-limiting examples of materials for cladding include aluminum gallium arsenide (AiGaAs), indium phosphide (InP), silicon dioxide ($SiO_2$), aluminum oxide ($Al_2O_3$), and combinations thereof.

After body 202 of semiconductor layers is formed, the semiconductor layers are cleaved along crystal planes to create flat, smooth facets, such as back facet 212 and front facet 218. In some embodiments, techniques can be used to shape the facets.

As shown in FIG. 2A, back end 210 of laser diode 200 includes a back facet 212, optionally with one or more layers 214 (coatings) formed adjacent to the back facet 212. Back facet 212 and one or more layers 214 can be referred to as a back mirror that has a relatively high reflectivity to help confine and reflect light back into the active region 206 of the laser diode 200, contributing to the amplification of light.

In some embodiments, back facet 212, optionally with one or more layers 214, has a reflectivity 215 of at least 70%, at least 80%, or even at least 90%.

Non-limiting examples of materials that can be used for one or more layers 214 include dielectric materials (e.g., silicon dioxide ($SiO_2$) and titanium dioxide ($TiO_2$)), tantalum pentoxide ($Ta_2O$), aluminum oxide ($Al_2O_3$), zirconium dioxide ($ZrO_2$), metallic coatings (e.g., gold (Au), silver (Ag)), aluminum (Al)), and combinations thereof.

Laser diode 200 includes light-exit facet 218 at the front end 216, which can be referred to as an emitting mirror having a relatively lower reflectivity 235 as compared to the back facet 212 to allow light 230 to escape, thereby forming laser diode 200 output for an apparatus such as read/write head.

According to the present disclosure, a mirror stack 220 is present on (or adjacent to) the light-exit facet 218. Referring to FIGS. 2A and 2B, a mirror stack according to the present disclosure includes two or more layers of dielectric material so that the mirror stack has a reflectivity 235 into the active region that is greater in laser diode-component form than a reflectivity 250 when the laser diode 200 is integrated into an apparatus 270 such as read/write head.

FIG. 2A illustrates a non-limiting example of the reflectivity of a mirror stack in laser diode-component form. As can be seen, the laser diode 200 has not yet been integrated into an apparatus such as a read-write head meaning that the space 240 adjacent to the outermost layer 222 is air or vacuum, not apparatus material like dielectric coupling medium 260 in FIG. 2B. Another non-limiting example of "laser diode-component form" is during fabrication on a wafer like discussed below in FIG. 3. The plurality of laser diodes 302 on substrate 300 are considered in "laser diode-component form" because air or vacuum would be present adjacent to the outermost layer of the mirror stack.

FIG. 2B illustrates a non-limiting example of the reflectivity of a mirror stack when the laser diode is integrated into an apparatus. As can be seen, instead of the space 240 adjacent to the outermost layer 222, apparatus material like dielectric coupling medium 260 is adjacent to the outermost layer 222.

Reflectivity refers to the fraction of light that is reflected off a surface when it encounters a boundary between two materials. The reflectivity at a surface depends on the difference in refractive indices of the two materials at the boundary. The larger the difference, the higher the reflectivity tends to be. Reflectivity can be calculated from the refractive index and the incidence angle using the Fresnel equations, which for normal incidence corresponds to:

$$R_0 = \left[ \frac{n1 - n2}{n1 + n2} \right]^2,$$

6 where $R_0$ is the reflectivity, $n_1$ is the refractive index of a first material, and $n_2$ is the refractive index of a second material that is different from the first material.

In some embodiments, mirror stack (e.g., mirror stack 220) has a reflectivity 235 into the active region 206 in laser diode-component form of at least 5%, at least 7%, or even at least 10% at a wavelength from 800 nm to 860 nm, while at the same time the mirror stack has a reflectivity 250 into the active region of less than 1%, less than 0.8%, less than 0.5%, or even less than 0.1% at a wavelength from 800 nm to 860 nm when the laser diode 200 is integrated into the apparatus 270 such as a read/write head.

The number of layers in the mirror stack, the thickness of each layer in the mirror stack, and the composition of each layer in the mirror stack are selected so that the mirror stack has a reflectivity into the active region that is greater in laser diode-component form than when the laser diode is integrated into an apparatus such as read/write head.

In some embodiments, a mirror stack according to the present disclosure includes at least two layers, at least three layers, at least four layers, at least five layers, etc.

Referring to FIG. 2A, mirror stack 220 includes three layers. An outermost layer 222, an innermost layer 226, and an intermediate layer 224 that is adjacent to each of the outermost layer 222 and the innermost layer 226.

Each layer of the mirror stack 220 can be selected to have a refractive index so that the mirror stack has a reflectivity into the active region that is greater in laser diode-component form than when the laser diode is integrated into an apparatus such as read/write head. Refractive index is a dimensionless number and is a measure of how much a material slows down light passing through it, thereby determining how much the light bends (refracts) when entering the material.

In some embodiments, the refractive index of the material for the outermost layer is selected relative to air and/or vacuum and the non-mirror stack material adjacent to the outermost layer when the laser diode is integrated into an apparatus. For example, referring to FIGS. 2A and 2B, the material for outermost layer 222 is selected to have a refractive index that is greater than both air and/or vacuum that may be present in space 240 and the dielectric coupling medium 260 that is adjacent to the outermost layer 222 when the laser diode 200 is coupled to apparatus 270, such as a HAMR read/write head. In some embodiments, the dielectric coupling medium 260 is chosen from silicon dioxide, silicon nitride, aluminum oxide, tantalum oxide, titanium dioxide, aluminum nitride, hafnium oxide, and combinations thereof.

In some embodiments, the refractive index of the material for the outermost layer is selected relative to the refractive index of one or more other layers in the mirror stack. For example, referring to FIG. 2A, outermost layer 222 has a refractive index that is greater than adjacent, intermediate layer 224. As another example, intermediate layer 224 has a refractive index that is less than each of the adjacent, innermost layer 226, and the adjacent, outermost layer 222. In some embodiments, each adjacent layer in a mirror stack can alternate between a relatively "high" refractive index and a relatively "low" refractive index. For example, referring to FIG. 2A, outermost layer 222 has a higher refractive index than the adjacent, intermediate layer 224, and the intermediate layer 224 has a refractive index that is less than the adjacent, innermost layer 226. This alternating pattern can continue for as many layers are in a mirror stack, if desired. In some embodiments, this alternating relationship of refractive index can be used in combination with an odd number of layers (e.g., three, five, etc.) in the mirror stack so that the mirror stack begins and ends with layers having the same refractive index, which may be higher or lower than one or more intermediate layers. For example, for three layers, the mirror stack begins and ends with layers having the same refractive index, which is relatively higher than the refractive index of the center layer. In some embodiments, the outermost layer has a refractive index from 1.3 to 3.8, or even from 1.4 to 2.4.

Each layer of a mirror stack according to the present disclosure can be made of a dielectric material so that the mirror stack has a reflectivity into the active region that is greater in laser diode-component form than when the laser diode is integrated into an apparatus such as read/write head. Non-limiting examples of dielectric material for a layer in a mirror stack include an oxide, a nitride, and combinations thereof. For example, one or more layers in a mirror stack can be made of silicon dioxide, silicon oxynitride, silicon nitride, aluminum oxide, tantalum oxide, titanium oxide, tantalum oxide, niobium oxide, and combinations thereof.

In some embodiments, the thickness of each layer in a mirror stack according to the present disclosure is from 50 nanometers (nm) to 300 nm, or even from 50 nm to 190 nm.

A laser diode is configured to be integrated into the apparatus to direct light from the light-exit fact of the laser diode to a waveguide in the apparatus. For example, as shown in FIG. 1 and discussed above, a laser diode can be coupled to or integrated into an apparatus 100 such as a HAMR read/write head. Because a laser diode includes a mirror stack according to the present disclosure at the light-exit facet 218 that has a reflectivity 250 that drops to near zero when the laser diode is coupled to an apparatus 270, the apparatus 270 can include one or more optical elements configured to reflect light 255 received from the laser diode 200 to the active region 206 of the laser diode for lasing. For example, referring to FIG. 1, apparatus 100 can include an optical element 130 located on the substrate 101 to reflect light received from the laser diode 105 to the active region of the laser diode 105 for lasing. In some embodiments, an optical element 130 can have a reflectivity into the active region of at least 3% at a wavelength from 800 nm to 860 nm. Non-limiting examples of optical element 130 include Bragg grating, diffraction grating, a mirror, and combinations thereof.

As mentioned above, laser diodes having a mirror stack according to the present disclosure can be used in an apparatus such as a HAMR read/write head. An example of fabricating HAMR read/write heads with on-wafer lasers having a mirror stack according to the present disclosure is illustrated in FIGS. 3 to 7.

Figures 3, 4, 5, 6, 7:
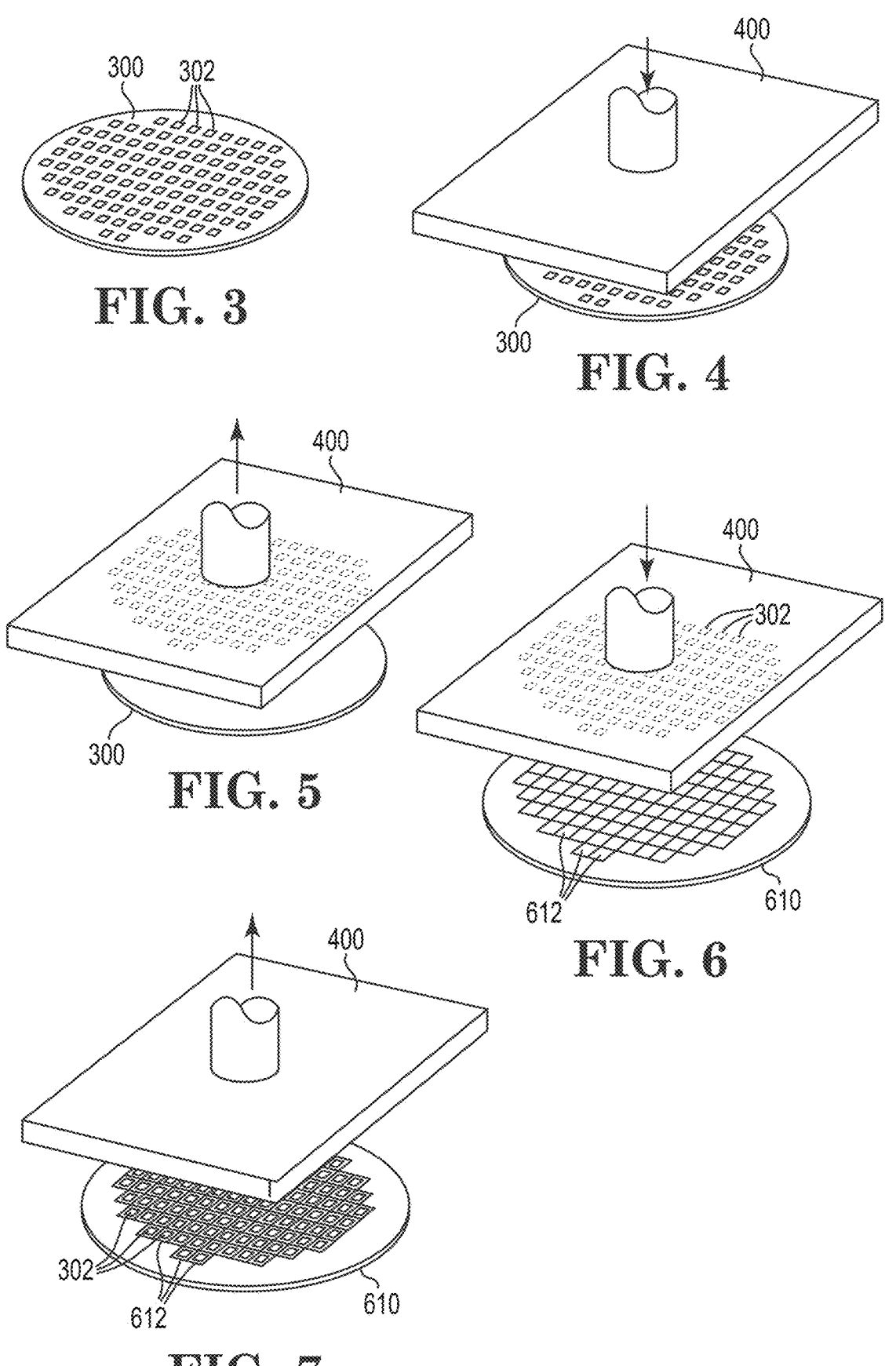
FIG. 3 is a perspective drawing showing a source substrate with a plurality of laser diodes.
FIG. 4 is a perspective drawing showing the transfer print head moving to "pick" the plurality of laser diodes from the source substrate shown in FIG. 3.
FIG. 5 is a perspective drawing showing the transfer print head of FIG. 4 lifting the "picked" plurality of laser diodes.
FIG. 6 is a perspective drawing showing the transfer print head moving to "print" the "picked" plurality of laser diodes from FIG. 5 to a source substrate.
FIG. 7 is a perspective drawing showing the transfer print head of FIG. 6 moving away from the "printed" plurality of laser diodes.

In FIG. 3, a donor or source substrate 300 is shown as a wafer that includes a plurality of laser diodes 302, such as laser diode 200, that were formed/fabricated on the substrate 300 via, e.g., epitaxial growth, photolithography, and/or etching. If desired, a sacrificial layer may be included between the laser diodes 302 and the substrate 300 to allow separation.

As shown in FIG. 4, a transfer print head 400 is lowered to contact the laser diodes 302 with sufficient pressure to temporarily "grip" the laser diodes via a handling layer (e.g., a soft material like polydimethylsiloxane, PDMS) to gently pick up the released laser diodes from the source substrate 300 or wafer without damaging them.

The transfer print head 400 is lifted as shown in FIG. 5, taking the laser diodes 302 with it. In this way, the laser diodes 302 are then transferred to a target substrate 610 as shown in FIGS. 6 and 7.

As seen in FIG. 6, the transfer print head 400 is lowered over a target substrate 610 or wafer that includes a number of partially-processed, read/write heads 612. The transfer print head 400 presses the laser diodes 302 on to the target substrate 610 and is then moved away as seen in FIG. 7 to transfer each of the laser diodes 302 to a corresponding read/write head. Afterwards, the substrate 610 is further processed, e.g., depositing additional layers of material to form the remaining read/write head components. A non-limiting example of further processing includes encapsulating each laser diode on each read/write head to integrate each laser diode into each read/write head, followed by dicing individual read/write heads to separate them from the target substrate 610.

It is noted that a laser diode can be tested for performance at a variety of points in the manufacturing process. For example, laser diodes in laser diode-component form can be tested in air while on the source substrate 300 so that light emits from the mirror stack of each laser diode into the air. Laser diodes can also be tested after encapsulation through a coupling mechanism so that light emits from the mirror stack of each laser diode into the encapsulation material (e.g., coupling medium).

Figure 8A:
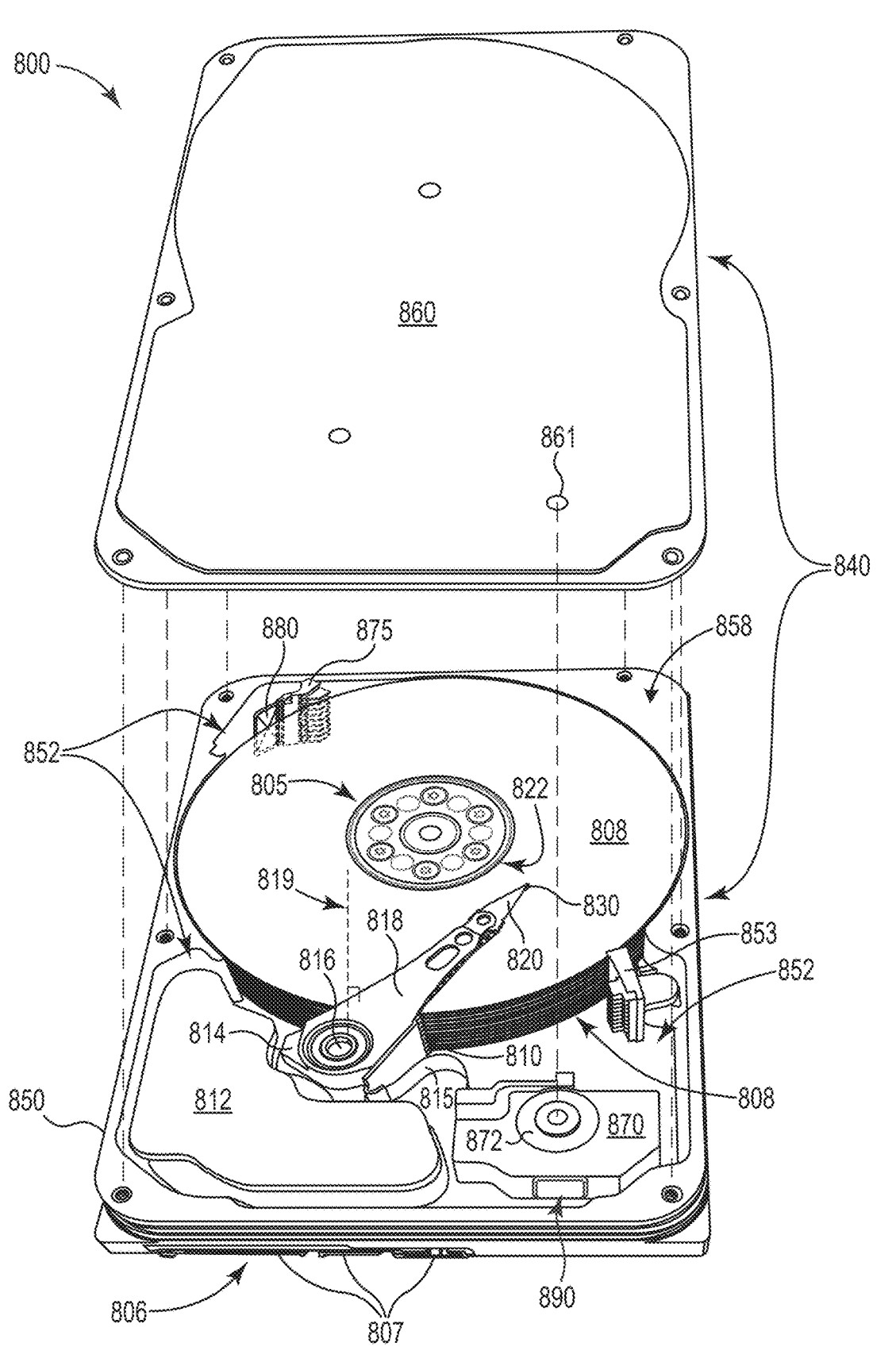
FIG. 8A is an exploded, perspective view of an example of a hard-disk drive that may include a read/write head having a laser diode with a mirror stack according to the present disclosure.

An apparatus that includes a laser diode having a mirror stack according to the present disclosure can be used in a data storage device such as a hard disk drive. A non-limiting example of a hard disk drive that can be use a laser diode having a mirror stack according to the present disclosure is illustrated in FIGS. 8A and 8B, Advantageously, such a hard disk drive can operate with reduced LPV in the read/write head, and therefore may be commercially superior.

Data storage device 800 is illustrated as a hard-disk drive (HDD) that includes an outer enclosure or housing 840 configured to contain multiple hard-disk drive components, including electronic components. Housing 840 includes a base 850 and a cover 860 mounted to the base 850. Base 850 includes a recess or cavity 852 configured to accommodate components of data storage device 800. Base 850 can also be referred to as a motor base assembly (MBA). Data storage device 800 further includes a printed circuit board assembly (PCBA) 806. PCBA 806 of this configuration is coupled to base 850 and includes a plurality of input/output connectors 807 that are each configured to provide an interface between one or more components of data storage device 800 and one or more host devices (e.g., a computer, a server, a consumer electronic device, or the like).

Base 850 and cover 860 may be formed from any suitable material, such as metal (e.g., aluminum), plastic, or other suitable material or combinations thereof. In some embodiments, base 850 includes multiple components, such as an outer frame and a bottom cover, that are coupled together (e.g., by screws, welding, or the like).

Figure 8B:
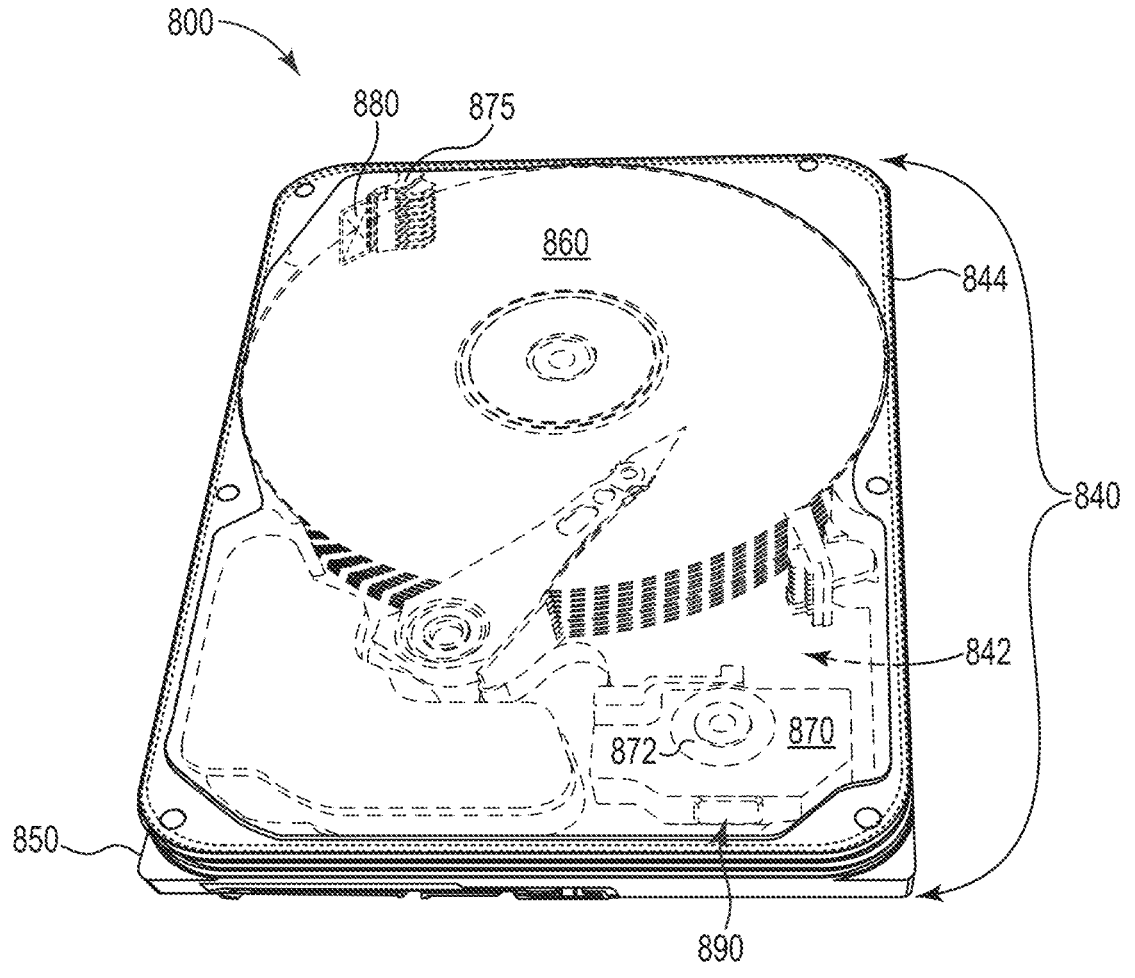
FIG. 8B is a perspective view of the hard-disk drive shown in FIG. 8A in its assembled configuration and showing interior components in broken lines.

Cover 860 is configured to couple to base 850 to enclose components of data storage device 800, as shown in FIG. 8B. As shown, cover 860 is aligned with and coupled to a surface of base 850, such as a surface 858 shown in FIG. 8A, to define an interior volume 842 of data storage device 800, which includes an interior gas space. A load/unload ramp 853 is also positioned in interior volume 842. Components other than those illustrated or specifically identified in FIGS. 8A and 8B and described herein are contemplated as being positioned within the interior volume 842, such as a preamp and/or assembly hardware, for example. Cover 860 can be coupled to the base 850 using any suitable technique, such as using one or more screws, connection fingers, locking/clipping structures, adhesives, rivets, other mechanical fasteners, welding (e.g., ultrasonic welding) or combinations thereof. In some embodiments, data storage device 800 can further include one or more seals disposed between base 850 and top cover 860 and configured to seal the interior volume 842 of data storage device 800. In some embodiments, seal 844 can be a weld formed between base 850 and cover 860, or seal 844 can be a form-in-place gasket (FIPG).

A gas or gas mixture may be added to interior volume 842 of data storage device 800. Helium, for example, may be included in interior volume 842 to reduce mechanical vibrations, particularly of head gimbal assemblies (HGAs) of data storage device 800. Helium may also be included within data storage device 800 to enable lower head-media spacing (HMS) between a reader and/or writer of a magnetic recording head and a magnetic disk, and thus a higher areal density capability (ADC) of data storage device 800. The interior gas space of the interior volume 842 may benefit from a small amount of oxygen. In some embodiments, interior gas space can have an oxygen concentration in the range from 0.1 to less than 20 mole percent, from 0.1 to 15 mole percent, or even from 3 to 15 mole percent based on the total gas in the interior gas space, with the balance being helium.

In some embodiments, data storage device 800 can be a sealed (hermetically sealed) data storage device, which can be defined by, e.g., the amount of gas (e.g., helium) that leaks from the data storage device after it has been sealed (e.g., a welded HDD). In some embodiments, a hermetically sealed data storage device having its interior gas space filled with helium gas has a nominal helium leak rate of less than 10% by volume in five years. In some embodiments, in terms of (atm cc/second), a hermetically sealed data storage device having its interior gas space filled with helium gas has a nominal helium leak rate of $10\times10^{-8}$ atm (atmosphere) cc (cubic centimeter)/second or less at 25° C.; $8\times10^{-8}$ atm cc/second or less, $5\times10^{-8}$ atm cc/second or less; or even $4\times10^{-8}$ atm cc/second or less at 25° C. As mentioned above, a form-in-place gasket can be used to help seal a data storage device.

Data storage device 800 includes an actuator 810, which includes a head stack assembly (HSA) 814 and voice coil motor 812. Head-stack assembly 814 is rotatably mounted to the base 850, and includes radially-extending arms 818 that are rotatable about an axis 819 that is perpendicular to the floor of base 850 as shown in FIG. 8A. Data storage device 800 includes one or more magnetic disks configured to store bits of data. HSA 814 further includes a plurality of head-gimbal assemblies (HGAs). Each HGA 820 includes a read/write head 830 for reading data from and writing data to a surface of a magnetic disk 808. HSA 814 can include one or more subcomponents. Non-limiting examples of such subcomponents include hookup 815 (a flex cable and a flex clamp) and/or adhesives. Other components of a read/write head 830 can be included, such as heaters, heat sinks, and piezoelectric actuators, for example.

Voice coil motor 812 produces a magnetic field that exerts a force on HSA 814, causing radially-extending arms to rotate about a shaft 816 in either rotational direction. Each radially-extending arm 818 is mechanically and rotatably coupled to shaft 816 such that as HSA 814 rotates it causes each radially-extending arm 818, and thus magnetic recording heads, to move relative to magnetic disks 808. Voice coil motor 812 includes magnets and a voice coil.

Data storage device 800 further includes a motor assembly 805 configured to rotatably support magnetic disks and circumferentially rotate magnetic disks about an axis of rotation during operation. Magnetic disks are mounted on motor assembly 805 such that an annular volume of each magnetic disk 808 encircles a portion of motor assembly

805. Further, magnetic disks are separated from each other in a stacked manner using spacers (not shown). Motor assembly 805 has an outside diameter 822 and may rotate magnetic disks during an operation of data storage device 800 such that each magnetic disk 808 moves relative to a respective read/write head 830 to enable the read/write heads to read data from and/or write data to the magnetic disk 808.

Data storage device 800 includes a diverter 875 that is proximal to magnetic disks 808. Diverter 875 is configured to divert helium and/or other interior gas mixtures(s) to reduce windage on each radially-extending arm 818, which can reduce undesired vibrations that may cause a read/write head 830 to move off track and/or contact a magnetic disk 808.

The data storage device 800 includes components having an adsorbent composition in the form an article that permits the components to be positioned and/or mounted in the interior volume 842 of data storage device 800 so that the adsorbent composition can adsorb moisture and/or organic vapors from the interior gas. In some embodiments, a component can also include filtering capability to remove organic particulate material. As shown in FIGS. 8A and 8B, non-limiting examples of such components include an environmental control module 870, a recirculation filter 880, and a label filter 890 for such a purpose. As shown, environmental control module 870 includes an inlet diffuser seal 872 helps its contents (e.g., environmental control module tablet (not shown)) dry during manufacturing. The environmental control module tablet can become exposed to the interior volume 842 of data storage device 800 by breaking the seal located at the bottom center of inlet diffuser seal 872 to create an opening (not shown) so that gas exchange can occur between the inside of environmental control module 870 and the interior volume 842.

Figure 9:
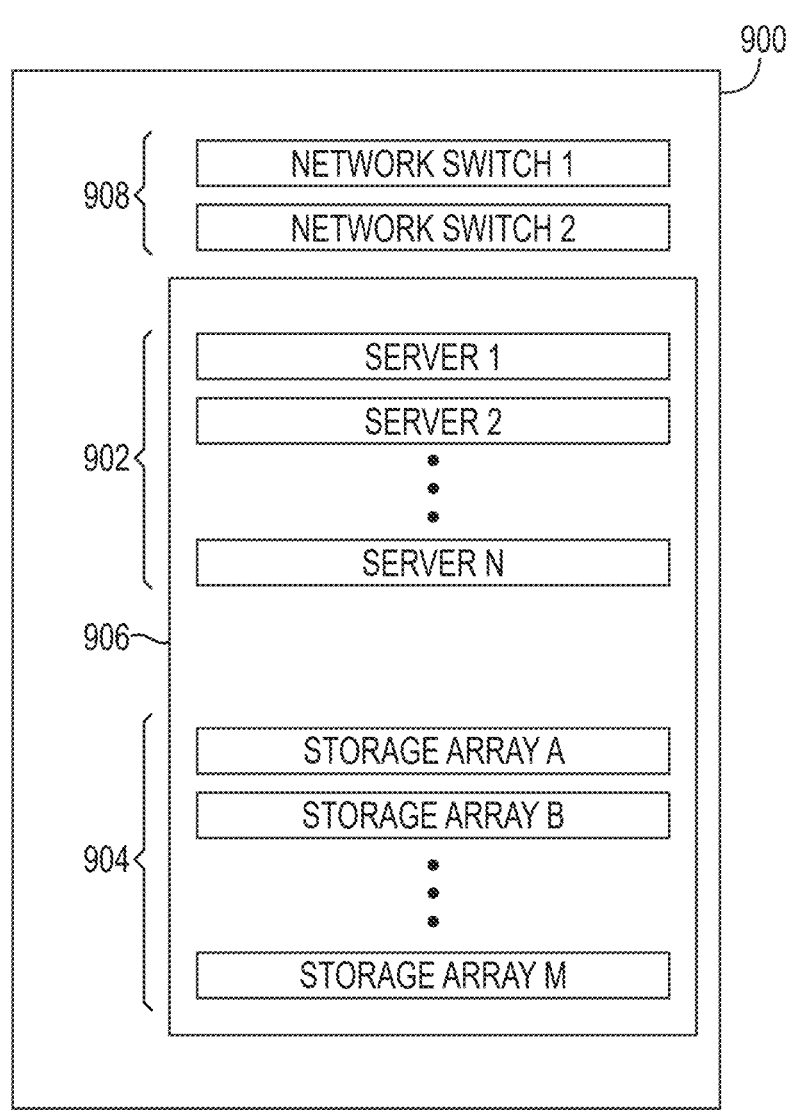
FIG. 9 is a block diagram of a data center system including a plurality of data storage devices according to the present disclosure.

FIG. 9 illustrates a non-limiting example of a computing system 900 that includes a plurality of data storge devices (e.g., data storage device 800) that include an absorbent composition according to the present disclosure. In FIG. 9, a diagram shows a computing system 900 that can have a computing enclosure used in network storage services. As shown, the computing enclosure includes a plurality of servers 902 coupled to a plurality of drive arrays 904 via a rack-level network fabric 906. Each server 902 can include at least one CPU coupled to random access memory (RAM) and an input/output (IO) subsystem. Each server 902 may have one or more dedicated power supplies (not shown) or the enclosure may provide power through a power bus (not shown). Each server 902 may also have an IO interface for connecting to the rack-level network fabric 906. The rack-level network fabric 906 may use other rack-level networking technology such as switches 908.

The drive arrays 904 may each include a separate sub-enclosure with IO busses, power supplies, storage controllers, etc. The drive arrays 904 include a plurality of individual data storage devices (e.g., HDD) densely packed into the sub-enclosure. An example of a data center that includes a computing system have a plurality of data storage devices is also described in U.S. Pat. No. 11,567,834 (Bent et al.).

What is claimed is:

1. A laser diode comprising:
   a body of one or more non-self-supporting layers of crystalline material, wherein the body has a light-exit facet at an end of the body, and wherein the body comprises an active region of the laser diode; and
   a mirror stack on the light-exit facet, wherein the mirror stack comprises two or more layers of dielectric material, wherein the mirror stack has a reflectivity into the active region that is greater in laser diode-component form than when the laser diode is integrated into an apparatus, and wherein the laser diode is configured to be integrated into the apparatus to direct light from the light-exit facet of the laser diode to a waveguide in the apparatus.

2. The laser diode of claim 1, wherein the two or more layers comprise an outermost layer of dielectric material, and wherein the mirror stack has a reflectivity into the active region that is greater when the outermost layer is adjacent to air, vacuum, and combinations thereof, than when the laser diode is integrated into an apparatus.

3. The laser diode of claim 1, wherein the two or more layers comprise an outermost layer of dielectric material that has a refractive index greater than at least one other layer of dielectric material in the mirror stack.

4. The laser diode of claim 3, wherein the two or more layers comprise a plurality of layers of dielectric material, wherein a refractive index of each layer is greater than a refractive index of each adjacent layer or less than the refractive index of each adjacent layer.

5. The laser diode of claim 4, wherein the plurality of layers comprises at least three layers.

6. The laser diode according to claim 2, wherein the refractive index of the outermost layer is greater than a refractive index of air and a refractive index of non-mirror stack material adjacent to the outermost layer when the laser diode is integrated into the apparatus.

7. The laser diode of claim 6, wherein the non-mirror stack material comprises a dielectric coupling medium.

8. The laser diode of claim 7, wherein the dielectric coupling medium is chosen from silicon dioxide, silicon nitride, aluminum oxide, and combinations thereof.

9. The laser diode of claim 1, wherein the mirror stack has a reflectivity into the active region in laser diode-component form of at least 5% at a wavelength from 800 nm to 860 nm, and wherein the mirror stack has a reflectivity into the active region of less than 1% at a wavelength from 800 nm to 860 nm when the laser diode is integrated into the apparatus.

10. The laser diode of claim 1, wherein each layer of the mirror stack has a thickness from 50 nm to 300 nm.

11. The laser diode of claim 1, wherein each layer of the mirror stack has a thickness from 50 nm to 190 nm.

12. The laser diode of claim 1, wherein each layer of the mirror stack comprises a dielectric material chosen from an oxide, a nitride, and combinations thereof.

13. The laser diode of claim 1, wherein each layer of the mirror stack comprises a dielectric material chosen from silicon dioxide, silicon oxynitride, silicon nitride, aluminum oxide, tantalum oxide, titanium oxide, tantalum oxide, niobium oxide, and combinations thereof.

14. A substrate comprising a plurality of laser diodes of claim 1.

15. An apparatus comprising:
a substrate;
a laser diode of claim 1, wherein the laser diode is located on the substrate;
a waveguide located on the substrate and optically coupled to receive light from the laser diode; and
a near-field transducer located on the substrate and optically coupled to receive light from the waveguide.

16. The apparatus of claim 15, further comprising one or more optical elements located on the substrate, wherein the one or more optical elements are external to the laser diode, and wherein the one or more optical elements are configured to reflect light received from the laser diode to the active region of the laser diode for lasing.

17. The apparatus of claim 16, wherein the one or more optical elements have a reflectivity into the active region of at least 3% at a wavelength from 800 nm to 860 nm.

18. The apparatus of claim 16, wherein the one or more optical elements are chosen from Bragg grating, diffraction grating, one or more mirrors, and combinations thereof.

19. A data storage device comprising at least one apparatus of claim 15.

20. A computing system comprising a plurality of data storage devices of claim 19.

* * * * *